July 7, 1959 E. S. BREMERMAN 2,893,938
ELECTROLYTIC STABILIZATION APPARATUS FOR WATER SYSTEMS
Filed Dec. 30, 1955 2 Sheets-Sheet 2

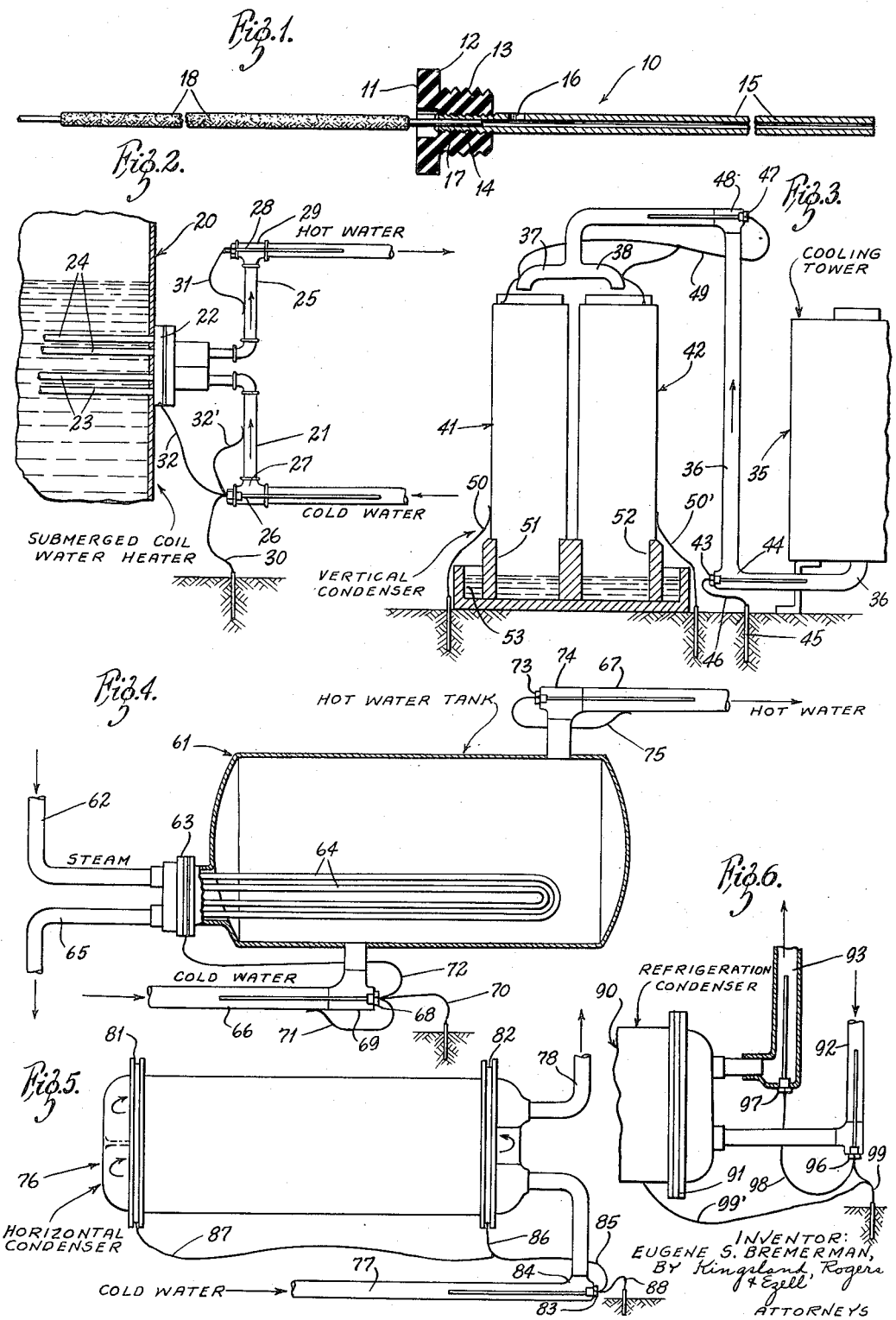

INVENTOR:
EUGENE S. BREMERMAN,
BY Kingsland, Rogers & Ezell
ATTORNEYS

United States Patent Office 2,893,938
Patented July 7, 1959

2,893,938

ELECTROLYTIC STABILIZATION APPARATUS FOR WATER SYSTEMS

Eugene S. Bremerman, Brentwood, Mo.

Application December 30, 1955, Serial No. 556,727

10 Claims. (Cl. 204—196)

This invention relates to improvements in apparatus for use in water systems for electrolytic stabilization, and in particular is concerned with the prevention of scale and algae formation.

In the past, scale formation and algae formation have been a troublesome source in water systems, and water conduits where these conditions are prevalent have, in extreme cases, become clogged or partially clogged to the extent where they impede water flow or heat transfer. In systems where heat flow through the walls of a conduit is desired to the water passing therein, as in condensers, evaporators, or hot water tanks, and the like, such formations have been a very great disadvantage. Efforts to combat this have taken form in the past through chemical treatment or externally applied electrical forces in an attempt to nuetralize the electrolytic forces within the system. It has been found in the instant invention that the inhibition of scale and algae formation can take place without either of these means through the provision of a relatively simple, fixed electrode which can be inserted within a system in an insulated fitting and then connected by cables to other parts of the system and grounded.

The fixed electrode of this invention is of special advantage in systems involving a temperature change where water is treated or otherwise processed, as in evaporators, condensers, and hot water tanks. A fixed electrode is made in a unitary design so that it may be readily installed and connected with a conducting cable to form a complete installation without requiring a redesigning of the system. Thus, the electrodes may be connected to the cold water inlets and the hot water outlets in the piping conduits through which the process water must pass in its entry and egress through the system. By such provision, and through simply made connections, scale formation and algae formation may be prevented and even removed with easy installation and a minimum in cost.

Accordingly, it is a principal object of this invention to provide an insulated electrode which can be used in water processing systems to prevent scale and algae formation therein.

It is a further object of this invention to provide an insulated electrode unit which is easy to install in pipes and conduits in water processing systems, and which can be attached by conducting cables to other parts of the system for the prevention of scale and algae formation.

Still another object of this invention is to provide an easily installed electrode unit comprising an insulating bushing and an open tubular electrode of brass which can be connected by electrical cables to various parts of a water processing system to prevent the formation of scale and algae.

Yet another object of this invention is to provide a system and an electrode arrangement in water treating apparatus wherein an insulated electrode can be made of conventional materials and installed with ease by relatively unskilled workmen at a minimum of cost.

Further objects of this invention will appear in the detailed description which follows and will be further apparent to those skilled in the art.

For the purpose of illustration only there are shown in the accompanying drawings the electrode of this invention and typical installations. It is to be understood that these drawings are for the purpose of example, and that the invention is not limited thereto.

In the drawings:

Figure 1 is a sectional view through the axis of the electrode;

Figure 2 is a fragmentary view partially in sectional elevation showing an installation of the electrode arrangement in a water heater;

Figure 3 is a view in elevation showing another installation in a vertical condenser;

Figure 4 is a view in sectional elevation showing another installation in a hot water tank;

Figure 5 is an elevational view showing an installation in a horizontal condenser;

Figure 6 is a fragmentary view partially in section showing an elevation of an installation in a refrigeration condenser;

Figure 7:
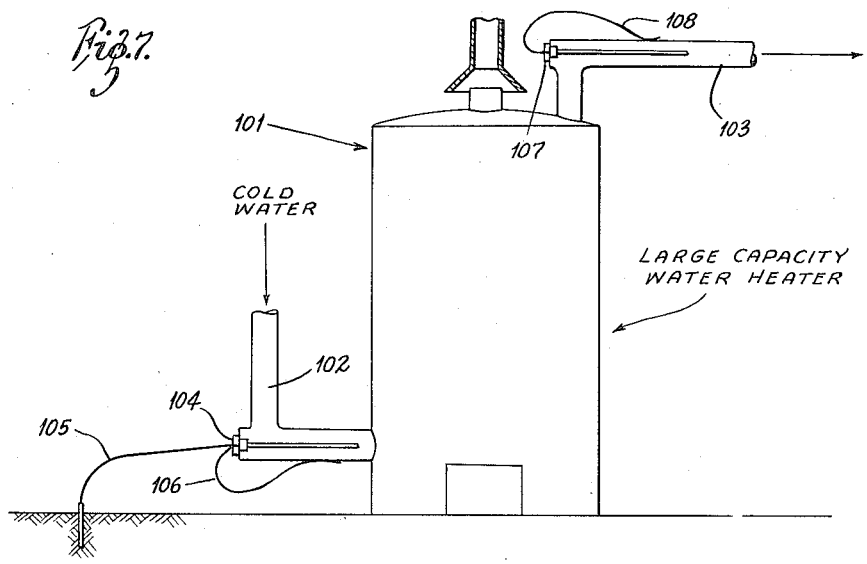
Figure 7 is an elevational view showing an installation in a large capacity water heater.

Referring now to Figure 1, the electrode is generally designated at 10. It comprises an insulated bushing 11 having a flange 12 and an externally threaded plug portion 13. The plug portion has a threaded opening 14 extending therethrough.

A tubular electrode 15 is threaded at one end so as to be received within the threaded opening 14. The electrode is open at its free end and has an opening 16 adjacent its base to permit free circulation of water. The electrode element is constructed of brass pipe and may be of various diameters of standard sizes such as ⅛ inch up to ½ inch or more for conventional installations. For normal usages, it is approximately 12 to 18 inches in length.

Brazed to the threaded end 17 of the electrode element is a copper cable 18. This establishes electrical contact from the electrode element through the cable and to other parts of the system in which the electrode is employed. Insulation is provided by the bushing 11 which may be made of an insulating plastic such as formica, or any other conventional insulating plastic or insulating material.

*Use.*—An important use of the electrode of this invention is in submerged coil water heaters and other installations of this type. Such a use is shown in Figure 2 where a submerged coil water heater is generally indicated at 20. In this unit a cold water inlet conduit is provided at 21 which is connected to the water heater at a header 22. Inlet coils are provided at 23, and water return from the heater into the header is provided through outlet coils 24. An outlet conduit 25 provides for directing the hot water to a desired place from the header.

In this installation an electrode unit 26 is inserted into a T 27 in the cold water inlet. A similar electrode unit 28 is inserted into a T 29 of the hot water conduit. The electrode unit 26 is grounded at 30 and electrically connected to the header 22 and the inlet pipe 21 through cables 32 and 32', respectively. The electrode unit 28 is electrically connected to the outlet conduit 25 by a cable 31. This arrangement provides an electrolytic neutralization between the cold water conduit 21 and the hot water conduit 25. This unit provides for effective scale and algae removal as well as the prevention of their formation.

The employment of the electrode unit of this invention in a vertical condenser is shown in Figure 3. In this installation a cooling tower is generally indicated at 35 and is provided with a conduit 36 leaving its bottom and having two outlets 37 and 38 opening onto the top of two vertical condensers 41 and 42.

An electrode unit 43 is provided in T 44 of the conduit 36 adjacent the bottom of the cooling tower and is grounded by a ground rod 45 connected to the electrode unit by a cable 46. A second electrode unit 47 is inserted in T 48 at the top of the conduit, and this electrode unit is connected by a cable 49 to the conduit outlets 37 and 38, and then the cable is multiplied overto the tube sheets of the vertical condensers 41 and 42 for grounding. Further, grounding of the shell is provided by ground cables 50 and 50. The bottom of the vertical condensers 41 and 42 are set within separate sumps 51 and 52 and an annular sump 53.

An installation in a hot water tank is shown in Figure 4. This tank, generally indicated at 61, has a steam inlet 62 connected to a header 63 secured to an end of the tank and steam tubes 64 with a steam outlet 65. A cold water inlet conduit 66 is provided which opens into the bottom of the tank. A hot water outlet 67 is similarly provided at the top of the tank.

An electrode unit 68 is secured into the cold water inlet conduit at a T 69 and is grounded by cable 70. This unit is then electrically connected to the cold water conduit by a cable 71 and to the header 63 by a cable 72. Another electrode unit 73 is secured in a T 74 for the hot water outlet. The electrode unit 73 is electrically connected to the hot water conduit by a cable 75.

An installation in a four-pass horizontal condenser is shown in Figure 5. The horizontal condenser generally indicated at 76 has a cold water inlet 77 opening into one pass at one end of the condenser and an outlet 78 opening into the fourth pass at the top end of the condenser. Headers 81 and 82 are provided at both ends of the unit to provide for the pass division, as is conventional in such apparatus.

An electrode unit 83 is inserted into an elbow 84 of the cold water inlet. A cable 85 is connected at one end to the electrode unit and to branches 86 and 87 at its other end leading to the headers 81 and 82. The electrode unit is further grounded through ground cable 88. This simple installation has been found to be quite effective in the prevention of scale formation and algae formation and, like the other installations described above, requires no internal changes in the apparatus.

The employment of this invention in a refrigeration condenser is shown in Figure 6. A refrigeration condenser of conventional design is generally indicated at 90 and is provided with a header 91 at its end as shown. The cold water processing stream passes through the refrigeration condenser through inlet conduit 92 and outlet 93. Two electrode units 96 and 97 are inserted in the conduits 92 and 93, respectively. These electrode units are electrically connected together by a cable 98. A ground is provided by ground cable 99 which is connected to the electrode unit 96. Shell 90 is grounded by ground cable 99'.

An installation is shown in a large capacity water heater generally indicated at 101 in Figure 7. This heater has a cold water inlet 102 and a hot water outlet 103. An electrode unit 104 is inserted into the cold water inlet and grounded by cable 105. This unit is then electrically connected to the inlet conduit by a cable 106. A second electrode unit 107 is inserted into the hot water outlet conduit 103 and is electrically connected thereto by a cable 108. This apparatus functions somewhat similarly to that of Figure 2 to prevent scale and algae formation by electrolytic neutralization.

Figure 8:
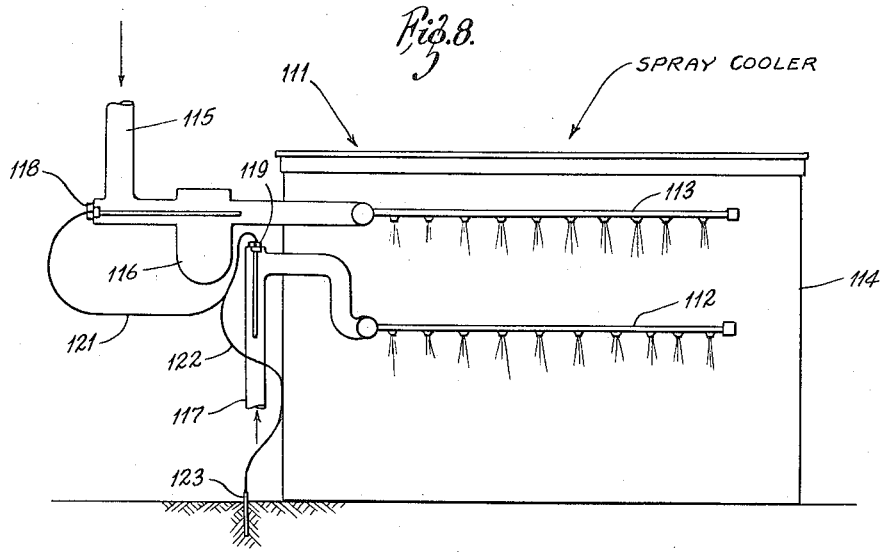
Figure 8 is an elevational view showing an installation in a spray cooler.

This invention is also applicable to installation in spray coolers such as the apparatus shown in Figure 8. A spray cooler is generally indicated at 111 in this figure. Several spray pipes such as those indicated at 112 and 113 are situated within the housing 114. It is to be understood that a conveyor device or the like may be disposed underneath these spray pipes and articles to be cooled or moistened may be placed therein. A spray water inlet conduit 115 equipped with a trap 116 is shown connected to the spray pipe 113 while an inlet conduit 117 rises vertically to be connected with the spray pipe 112.

Electrode units 118 and 119 are inserted in these conduits 115 and 117, respectively, with a cable 121 connecting them electrically. A separate cable 122 branches off from the cable and leads to the metal housing 114 and then to a ground rod 123. This apparatus has been found to be quite effective to prevent algae and scale formation in the spray pipes which was in the past very troublesome in causing clogging of the openings in the spray pipes.

There have been described above various installations of the electrode unit of this invention in typical water heaters, condensers and processing units. In each of these installations effective scale formation and algae formation can be prevented and also removed. Tests on these installations with the electrode have been performed and have satisfactorily demonstrated its utility through the prevention of formation of scale and algae. It is to be understood that the invention is not limited to the identical installations shown, but as broader utility and can be employed in other water processing apparatus where scale formation and algae formation is a problem. Such changes and modifications are within the skill of the art and are provided for by the teachings of this invention.

What is claimed is:

1. In an apparatus for physically treating water having a metallic water inlet thereto, an electrode assembly in said inlet, said assembly comprising an elongated rigid electrode immersed in water in the inlet and having one end extending freely into said inlet and terminating therein in spaced relation to the walls of said inlet, means for securing an opposite end of said electrode to a wall of the inlet in electrical insulating relationship thereto, means for connecting said last named electrode end to the apparatus at a point where the temperature is different from the water inlet, and means for grounding said last named electrode end.

2. In a water treating apparatus having a metallic shell and a metallic conduit for leading water thereto, an electrical insulating member secured to a wall of said conduit, an elongated rigid electrode of electrical conducting material fastened to said member at one end and having its opposite end immersed in water and extending freely into the interior of said water conduit and terminating, in spaced relation to its walls, an electrical connection electrically joining the end of said electrode secured to said insulating member to said metallic reservoir and an electrical ground connection for the end of said electrode secured to said insulating member.

3. In a water heater having a metallic shell and metallic inlet and outlet conduits, an electrical insulating member secured to a wall of said inlet conduit, an elongated rigid electrode of electrical conducting material fastened to said member at one end and having its opposite end immersed in water and extending freely into the interior of said water conduit and terminating in spaced relation to its walls, an electrical connection electrically joining the end of said electrode secured to said insulating member to said metallic reservoir and an electrical ground connection for the end of said electrode secured to said insulating member.

4. In a vertical condenser having a metallic shell and an inlet water conduit provided with an opening in spaced relation to said shell, an electrical insulating member secured to a wall of said conduit, an elongated rigid electrode of electrical conducting material fastened to said member at one end and having its opposite end immersed in water and extending freely into the interior of said water conduit and terminating in spaced relation to its walls, an electrical connection electrically joining the end of said electrode secured to said insulating member to said metallic reservoir and an electrical ground connection for the end of said electrode secured to said insulating member.

5. In a condenser having a metallic shell divided into a plurality of passes for the passage of water from one end of said shell to the other, and metallic inlet and outlet conduits, an electrical insulating member secured to a wall of said inlet conduit, an elongated rigid electrode of electrical conducting material fastened to said member at one end and having its opposite end immersed in water and extending freely into the interior of said water conduit and terminating in spaced relation to its walls, an electrical connection electrically joining the opposed ends of the condenser to the end of said electrode secured to said insulating member and to said metallic reservoir and an electrical ground connection for the end of said electrode secured to said insulating member.

6. In a refrigeration condenser having a metallic shell and metallic conduits leading thereto for the passage of water therethrough, electrical insulating members secured to a wall in each of said conduits, an elongated rigid electrode of electrical conducting material separately secured to each of said members at one end and freely extending into the interior of said conduits and terminating in spaced relation to the walls thereof at their other ends and being immersed in water, the secured ends of each electrode being electrically connected to each other, and to the metallic shell of the condenser and to a ground connection.

7. A water heater having a metallic shell and metallic inlet and outlet conduits, electrical insulating members secured to a wall in each of said conduits, an elongated rigid electrode of electrical conducting material separately secured to each of said members at one end and freely extending into the interior of said conduits and terminating in spaced relation to the walls thereof at their other ends and being immersed in water, the secured ends of each electrode being electrically connected to the conduit to which they are connected at a point spaced from their connection, and said electrode connected in the inlet conduit being further connected to ground.

8. In a spray cooler having at least one spray pipe connected to an inlet water conduit, an electrical insulating member secured to a wall of said inlet conduit, an elongated rigid electrode of electrical conducting material fastened to said member at one end and having its opposite end immersed in water and extending freely into the interior of said water conduit and terminating in spaced relation to its walls, and an electrical connection electrically joining the end of said electrode secured to said insulating member to a metal wall of the spray cooler and to ground.

9. In a spray cooler having a plurality of metal spray pipes connected to inlet water conduits, electrical insulating members secured to a wall in each of said conduits, an elongated rigid electrode of electrical conducting material separately secured to each of said members at one end and freely extending into the interior of said conduits and terminating in spaced relation to the walls thereof at their other ends and being immersed in water, the secured ends of each electrode being electrically connected to each other and to a metal wall of the housing and a common ground.

10. An electrode assembly for use in metallic water processing apparatus, said electrode assembly comprising a plug made of an electrical insulating material, an elongated rigid tubular electrode element extending freely from the interior of the plug in insulated relation to the exterior of said plug, said electrode being supported at its rear end within said plug, said tubular electrode element being open at the forward end opposed to said plug and being provided with an opening in the tubular wall adjacent the plug for the passage of water through said electrode element and means for connecting an electrical conducting cable to the rear end of said electrode element.

References Cited in the file of this patent
UNITED STATES PATENTS

| | | |
|---|---|---|
| 72,794 | Cabell | Dec. 31, 1867 |
| 1,032,295 | Politz | July 9, 1912 |
| 1,984,899 | Smith | Dec. 18, 1934 |
| 2,310,757 | Wagner | Feb. 9, 1943 |
| 2,329,019 | Wagener | Sept. 7, 1943 |

OTHER REFERENCES

Evans: Metallic Corrosion, Passivity and Protection, Edward Arnold and Company, London, 1948, pages 501–504.